(12) United States Patent
Mochida et al.

(10) Patent No.: US 11,941,474 B2
(45) Date of Patent: Mar. 26, 2024

(54) CARD READER

(71) Applicant: NIDEC SANKYO CORPORATION, Nagano (JP)

(72) Inventors: Tetsuo Mochida, Nagano (JP); Kazunori Takahashi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 18/174,817

(22) Filed: Feb. 27, 2023

(65) Prior Publication Data

US 2023/0274104 A1    Aug. 31, 2023

(30) Foreign Application Priority Data

Feb. 28, 2022   (JP) ................................ 2022-030286

(51) Int. Cl.
*G06K 7/00*   (2006.01)
(52) U.S. Cl.
CPC ................. *G06K 7/0021* (2013.01)
(58) Field of Classification Search
CPC .................................................. G06K 7/0021
USPC ....................................................... 235/441
See application file for complete search history.

(56) References Cited

U.S. PATENT DOCUMENTS

| | | | |
|---|---|---|---|
| 2010/0038429 A1* | 2/2010 | Orii ...................... | G06K 13/085 235/483 |
| 2011/0121078 A1* | 5/2011 | Watanabe ............ | G06K 13/085 235/486 |
| 2017/0236038 A1* | 8/2017 | Aiyoshi ............... | G06K 13/085 235/449 |
| 2019/0164388 A1* | 5/2019 | Ozasa ................... | G07F 19/207 |
| 2022/0036016 A1* | 2/2022 | Chen .................... | G06K 7/0091 |
| 2022/0215187 A1* | 7/2022 | Haller .................. | G06K 7/0078 |

FOREIGN PATENT DOCUMENTS

| | | |
|---|---|---|
| JP | 2010026826 A | 2/2010 |
| JP | 2020197890 A | 12/2020 |

* cited by examiner

*Primary Examiner* — Allyson N Trail
(74) *Attorney, Agent, or Firm* — CANTOR COLBURN LLP

(57) ABSTRACT

A card reader includes a pulling-out prevention member turnable between a closing position where a card moving passage is closed and an open position and preventing pulling-out of a card having been inserted into a card reader at the closing position. The pulling-out prevention member is provided with a main body member and a card abutting member which closes the card moving passage when the pulling-out prevention member is located at the closing position. A rear end of the card abutting member is capable of contacting with a front end of the card having been inserted into the card reader when the pulling-out prevention member is located at the closing position. The main body member of the pulling-out prevention member is formed of resin, and the card abutting member is formed of material having a strength higher than a strength of the resin.

6 Claims, 10 Drawing Sheets

CARD READER

CROSS REFERENCE TO RELATED APPLICATION

The present invention claims priority under 35 U.S.C. § 119 to Japanese Application No. 2022-030286 filed Feb. 28, 2022, the entire content of which is incorporated herein by reference.

TECHNICAL FIELD

At least an embodiment of the present invention may relate to a card reader structured to perform reading of data recorded in a card and recording of data to a card.

BACKGROUND

Conventionally, a so-called dip type card reader has been known which is structured so that a user manually operates a card to perform reading of data recorded in a card and recording of data to the card (see, for example, Japanese Patent Laid-Open No. 2010-26826 (Patent Literature 1) and Japanese Patent Laid-Open No. 2020-197890 (Patent Literature 2)).

An inside of the card reader described in Patent Literature 1 is formed with a card moving passage where a card inserted through a card insertion port is moved. The card reader includes an IC (integrated circuit) contact block for performing communication of data with an IC chip incorporated in the card.

Further, the card reader described in Patent Literature 1 includes a lever member which prevents pulling-out of a card having been inserted into an inside of the card reader. A front end side of the lever member is formed with a protruded part which is abutted with a front end of a card having been inserted into the inside of the card reader. The lever member is capable of turning between a closing position where the protruded part closes the card moving passage and an open position where the protruded part opens the card movable passage, and the lever member prevents pulling-out of the inserted card at the closing position. Further, the card reader includes a torsion coil spring which urges the lever member toward the closing position, a restriction pin which restricts turning of the lever member at the closing position, and a solenoid which moves the restriction pin between a turning restriction position where turning of the lever member is restricted and a turnable position where the lever member is capable of turning.

In the card reader described in Patent Literature 1, in a state that a card is not inserted into the card reader, the lever member is located at the closing position by an urging force of the torsion coil spring and the protruded part closes a front end side of the card moving passage. In this state, when a card is inserted, a rear end of the card is contacted with an inclined face formed on a front end of the protruded part. When the rear end of the card is contacted with the inclined face which is formed at the front end of the protruded part, the inclined face is moved along the rear end of the card and thus, the lever member is turned to the open position against an urging force of the torsion coil spring, and the front end side of the card moving passage is opened.

Further, when the card is inserted to a predetermined position on a rear side of the card reader, the lever member is turned by the urging force of the torsion coil spring and returned to the closing position, and the front end side of the card moving passage is closed by the protruded part. In this state, when the solenoid is driven, the restriction pin located at the turnable position is moved to the turning restriction position and turning of the lever member located at the closing position is restricted. In this state, communication of data is performed between the card and the card reader. Further, in this state, even if a user is trying to pull out the card to a front side, pulling-out of the card is prevented by the protruded part which closes the front end side of the card moving passage.

When communication of data between the card and the card reader finishes, energization to the solenoid is stopped and thus, the restriction pin located at the turning restriction position is moved to the turnable position where the lever member is set in a turnable state. In this state, when the card is being pulled out toward a front side, a front end of the card is contacted with an abutting face which is formed at a rear end of the protruded part. When the front end of the card is contacted with the abutting face formed at a rear end of the protruded part, the abutting face is moved along the front end of the card and thus, the lever member is turned to the open position against an urging force of the torsion coil spring, and the front end side of the card moving passage is opened.

In a card reader described in Patent Literature 2, when a pulling-out prevention member is located at a closing position, a rear end of a card abutting part of the pulling-out prevention member is capable of contacting with a front end of a card having been inserted in the card reader, and a width of a rear end part of the card abutting part of the pulling-out prevention member is set to be narrower toward a rear side.

Recently, as a card such as a credit card which is capable of being inserted into a card reader, a metal card which uses stainless steel material begins to circulate.

A conventional pulling-out prevention member is formed of resin and thus, damage (abrasion and dent) of the pulling-out prevention member may occur due to insertion and pulling-out of a metal card. When the pulling-out prevention member has been damaged, functional disorder of a card reader may occur, for example, insertion and pulling-out of a card to and from a card reader may become difficult, and a card insertion and pulling-out detection function and a latch function are not normally operated.

On the other hand, it is conceivable that a pulling-out prevention member is formed of material having high strength such as metal. However, when a pulling-out prevention member is formed of metal or the like, weight of the pulling-out prevention member is increased and thus, for example, turning control of the pulling-out prevention member becomes difficult because the pulling-out prevention member is urged by a torsion coil spring.

SUMMARY

In view of the problem described above, at least an embodiment of the present invention may advantageously provide a card reader in which increase of weight of a pulling-out prevention member for preventing pulling-out of an inserted card is restrained and, even when a hard card which is, for example, made of metal is inserted into a card reader, damage of the pulling-out prevention member can be restrained.

According to at least an embodiment of the present invention, there may be provided a card reader which is structured to perform at least one of reading of data recorded in a card and recording of data to the card. The card reader includes a card moving passage where the card is moved, a pulling-out prevention member which is structured so as to be turnable between a closing position where the card moving passage is closed and an open position where the card moving passage is opened and which prevents pulling-out of the card having been inserted into the card reader at the closing position, an urging member which urges the pulling-out prevention member toward the closing position, a turning restriction member which is abutted with the pulling-out prevention member located at the closing position to restrict turning of the pulling-out prevention member, and a moving mechanism which moves the turning restriction member between a turning restriction position where turning of the pulling-out prevention member is restricted and a turnable position where turning of the pulling-out prevention member is permitted. In addition, in a case that a direction perpendicular to a moving direction of the card which is moved along the card moving passage and a thickness direction of the card moved along the card moving passage is referred to as a width direction of the card and, in the moving direction of the card, in a case that an inserting direction side of the card into the card reader is referred to as a rear side, and an opposite side to the rear side which is a pulling-out direction side of the card from the card reader is referred to as a front side, the pulling-out prevention member includes a main body member and a card abutting member which closes a part of the card moving passage when the pulling-out prevention member is located at the closing position, and the pulling-out prevention member is capable of turning with the width direction of the card as an axial direction of turning, and a rear end of the card abutting member is capable of contacting with a front end of the card having been inserted into the card reader when the pulling-out prevention member is located at the closing position, and the main body member is formed of resin, and the card abutting member is formed of material having a strength higher than a strength of the resin.

Effects of the Invention

According to at least an embodiment of the present invention, while restraining increase of weight of the pulling-out prevention member for preventing pulling-out of an inserted card, even when a hard card which is, for example, made of metal is inserted into the card reader, damage of the pulling-out prevention member can be restrained.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and where like elements are numbered alike in several Figures, in which.

DETAILED DESCRIPTION

Embodiments of the present invention will be described below with reference to the accompanying drawings.

First Embodiment (Schematic Structure of Card Reader)

Figure 1:
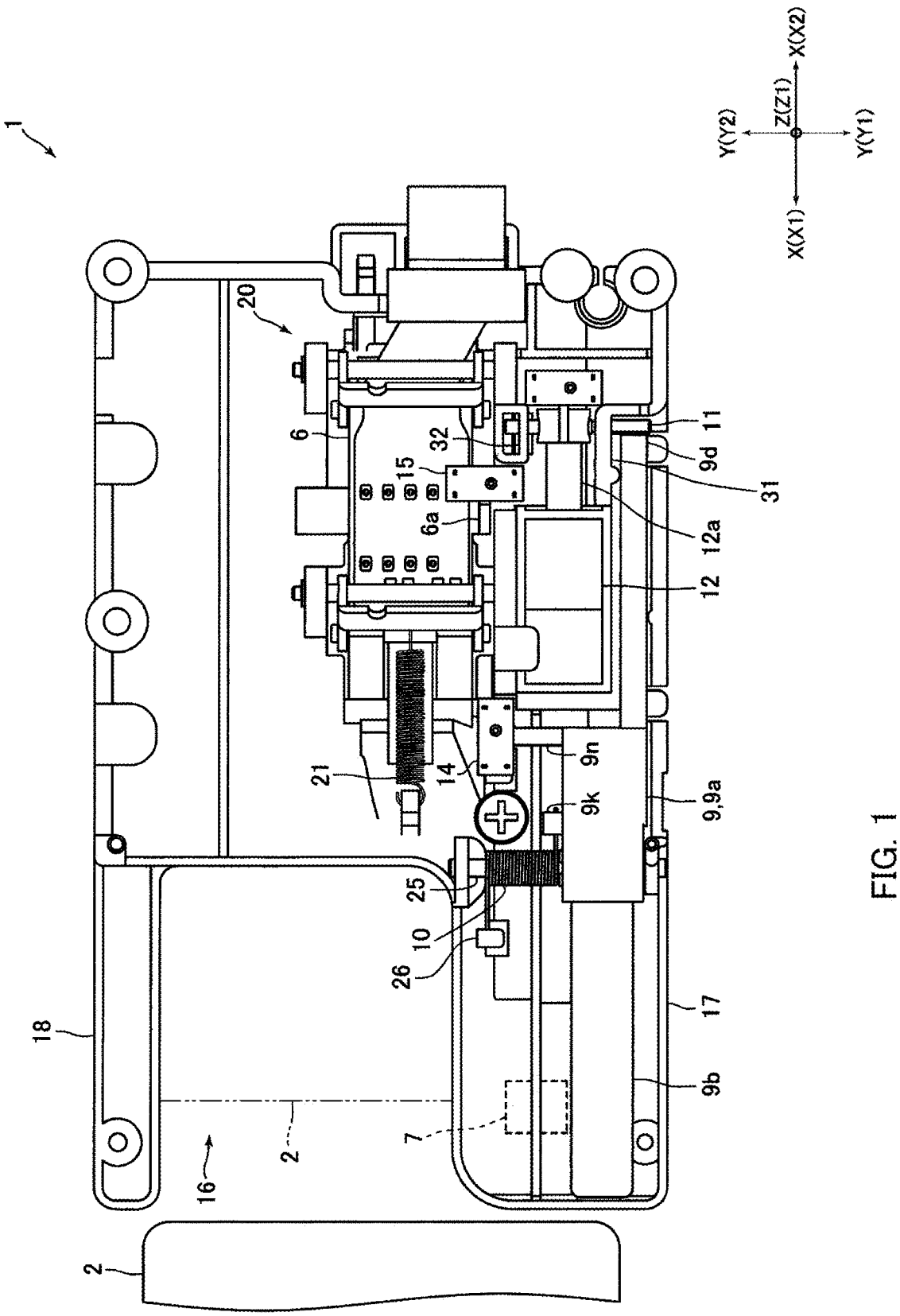
FIG. 1 is an explanatory plan view showing a structure of a card reader in accordance with an embodiment of the present invention.
Figure 2:
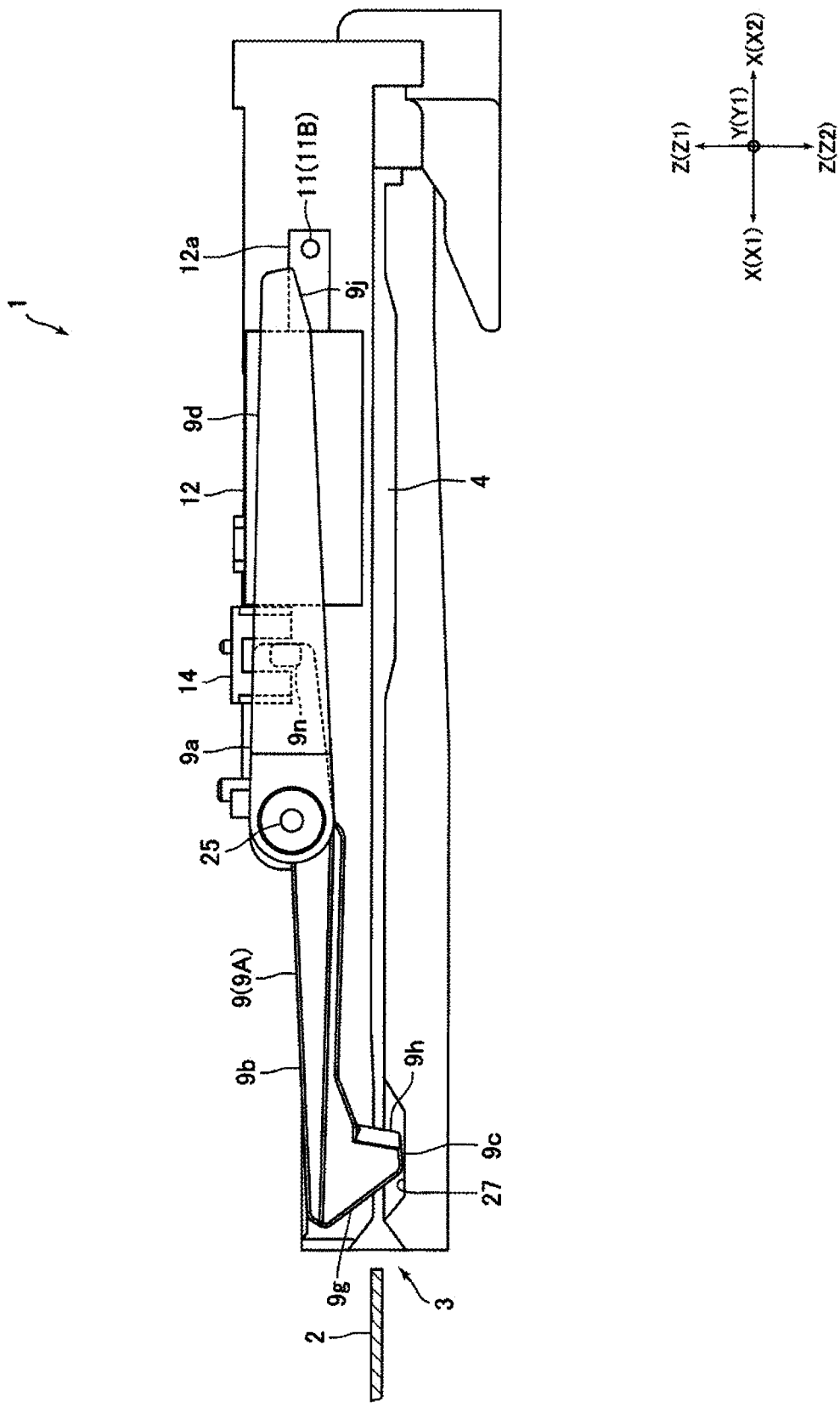
FIG. 2 is an explanatory side view showing a schematic structure of the card reader shown in FIG. 1.

FIG. 1 is an explanatory plan view showing a structure of a card reader 1 in accordance with a first embodiment of the present invention. FIG. 2 is an explanatory side view showing a schematic structure of the card reader 1 shown in FIG. 1.

A card reader 1 in this embodiment is a device in which a card 2 is manually operated by a user and at least one of reading of data recorded in a card 2 and recording of data to a card 2 is performed. Specifically, the card reader 1 is a so-called dip type card reader in which reading and recording of data are performed by manually performing insertion of a card 2 to the card reader 1 and pulling-out of the card 2 from the card reader 1. The card reader 1 is mounted on a predetermined host apparatus (not shown) and used.

The card reader 1 is formed with a card moving passage 4 where a card 2 inserted through a card insertion port 3 is moved. The card reader 1 includes an IC contact block 6 having a plurality of IC contact springs and a magnetic head 7. Further, the card reader 1 includes a lever member 9 as a pulling-out prevention member for preventing pulling-out of a card 2 having been inserted into the card reader 1. The lever member 9 is capable of turning between a closing position 9A (position shown in FIG. 2 and FIG. 3B) where the card moving passage 4 is closed and an open position 9B (position shown in FIG. 3A) where the card moving passage 4 is opened. The lever member 9 prevents pulling-out of a card 2 having been inserted into the card reader 1 at the closing position 9A.

In addition, the card reader 1 includes a torsion coil spring 10 as an urging member which urges the lever member 9 toward the closing position 9A, a restriction pin 11 as a turning restriction member which is abutted with the lever member 9 located at the closing position 9A to restrict turning of the lever member 9, and a solenoid 12 as a moving mechanism structured to move the restriction pin 11 between a turning restriction position 11A (position shown in FIG. 3B) where turning of the lever member 9 is restricted and a turnable position 11B (position shown in FIG. 2 and FIG. 3A) where turning of the lever member 9 is permitted.

Further, the card reader 1 includes sensors 14 and 15 for detecting presence or absence of a card 2. The sensors 14 and 15 are a transmission type optical sensor which includes a light emitting element and a light receiving element which are disposed so as to face each other. In the following descriptions, a state that a light from the light emitting element of each of the sensors 14 and 15 toward the light receiving element is blocked is defined as an "ON" state in each of the sensors 14 and 15, and a state that the light receiving element of each of the sensors 14 and 15 receives a light from the light emitting element is defined as an "OFF" state in each of the sensors 14 and 15.

In this embodiment, a card 2 is moved in an "X" direction in FIG. 1 and the like. In other words, the "X" direction is a moving direction of a card 2 which is moved in the card movable passage 4. Further, the "Z" direction in FIG. 1 and the like which is perpendicular to the "X" direction is a thickness direction of a card 2 which is moved in the card moving passage 4, and the "Y" direction in FIG. 1 and the like which is perpendicular to the "X" direction and the "Z" direction is a width direction of a card 2 which is moved in the card moving passage 4. In the following descriptions, the "X" direction is referred to as a front and rear direction, the "Y" direction is referred to as a right and left direction, and the "Z" direction is referred to as an upper and lower direction.

Further, in the following descriptions, the "X1" direction side in FIG. 1 and the like which is one side in the front and rear direction is referred to as a "front" side, the "X2" direction side in FIG. 1 and the like which is an opposite side to the front side is referred to as a "rear" side or a "back" side, the "Y1" direction side in FIG. 1 and the like which is one side in the right and left direction is referred to as a "right" side, the "Y2" direction side in FIG. 1 and the like which is an opposite side to the right side is referred to as a "left" side, the "Z1" direction side in FIG. 2 and the like which is one side in the upper and lower direction is referred to as an "upper" side, and the "Z2" direction side in FIG. 2 and the like which is an opposite side to the upper side is referred to as a "lower" side. Further, in the following descriptions, a direction in a clockwise direction in FIG. 2 is referred to as a "clockwise direction", and a direction in a counterclockwise direction in FIG. 2 is referred to as a "counterclockwise direction".

A card 2 is a card made of metal (stainless steel as one example) in a rectangular shape having a thickness of about 0.7 mm (millimeter) to about 0.8 mm. A rear face of a card 2 is formed with a magnetic stripe in which magnetic data are recorded. Further, an IC chip is incorporated in the card 2, and a front face of the card 2 is formed with external connection terminals of the IC chip. In accordance with an embodiment of the present invention, a card 2 may be provided with no magnetic stripe. Further, a communication antenna may be incorporated in a card 2.

A card 2 is inserted into the card reader 1 in a state that a front face of the card 2 faces an upper side and a longitudinal direction of the card 2 is substantially coincided with the front and rear direction. Specifically, a card 2 is inserted into the card reader 1 toward a rear side. Further, the card 2 is pulled out from the card reader 1 toward a front side. In other words, the rear side ("X2" direction side) is an inserting direction side of a card 2 to the card reader 1, and the front side ("X1" direction side) is a pulling-out direction side of a card 2 from the card reader 1.

In this embodiment, in addition to a metal card 2, a vinyl chloride card, a PET (polyethylene terephthalate) card and a paper card may be also inserted into the card reader 1.

As shown in FIG. 1, a part of the front end side of the card reader 1 is formed as a cut-out part 16 which is cut out so that insertion of a card 2 and pulling-out of the card 2 can be performed by a user. The cut-out part 16 is formed so as to be cut out from a front end of a frame of the card reader 1 toward a rear side. Further, the cut-out part 16 is formed at an intermediate position of the frame of the card reader 1 in the right and left direction, and protruded parts 17 and 18 are formed on both sides of the cut-out part 16 in the right and left direction. The protruded part 17 is disposed on the right side of the cut-out part 16, and the protruded part 18 is disposed on the left side of the cut-out part 16. A width in the right and left direction of the cut-out part 16 is set to be a size which is capable of accommodating fingers of a user.

As shown in FIG. 2, the card movable passage 4 is formed in a straight line shape when viewed in the right and left direction. A front end of the card moving passage 4 is formed with a card insertion port 3. As shown by a two-dot chain line in FIG. 1, a part of a card 2 having been inserted to a rear side of the card reader 1 is exposed in the cut-out part 16. A magnetic head 7 is disposed in a front end portion of the protruded part 17. Further, the magnetic head 7 is disposed so as to face the card moving passage 4 from a lower side.

An IC contact block 6 is disposed in a rear end side portion of the card reader 1. The IC contact block 6 is disposed so that IC contact springs face the card moving passage 4 from an upper side, and the IC contact block 6 is disposed on an upper side with respect to the card moving passage 4. The IC contact block 6 is connected with an upper face side portion of the frame of the card reader 1 through a parallel link mechanism 20 and is moved up and down while sliding in the front and rear direction. The IC contact block 6 is urged to a front side by a tension coil spring 21.

In this embodiment, when a tip end (rear end) of a card 2 inserted to a rear side of the card reader 1 is engaged with a card engaging part (not shown) of the IC contact block 6, the IC contact block 6 is moved downward while sliding to the rear side and a plurality of the IC contact springs is contacted with external connection terminals of the card 2. Further, when the card 2 having been inserted to the rear side is pulled out to a front side, the IC contact block 6 is moved upward while sliding to the front side by an urging force of the tension coil spring 21 and the IC contact springs are separated from a front face of the card 2.

The IC contact block 6 is formed with a light shading part 6a for detecting presence or absence of a card 2 on a rear end side of the card reader 1. In this embodiment, when the IC contact block 6 is located on a front side by an urging force of the tension coil spring 21, the light receiving element of the sensor 15 receives a light from the light emitting element. On the other hand, a card 2 is inserted into the card reader 1 and the IC contact block 6 is slid to a rear side and then, when the IC contact springs are contacted with external connection terminals of the card 2, a light from the light emitting element of the sensor 15 toward the light receiving element is shaded by the light shading part 6a. In this embodiment, when a light from the light emitting element of the sensor 15 toward the light receiving element is shaded by the light shading part 6a and the sensor 15 is turned to an "ON" state, it is detected that a card 2 exists on a rear end side of the card reader 1.

(Structure of Lever Member)

Figure 3A:
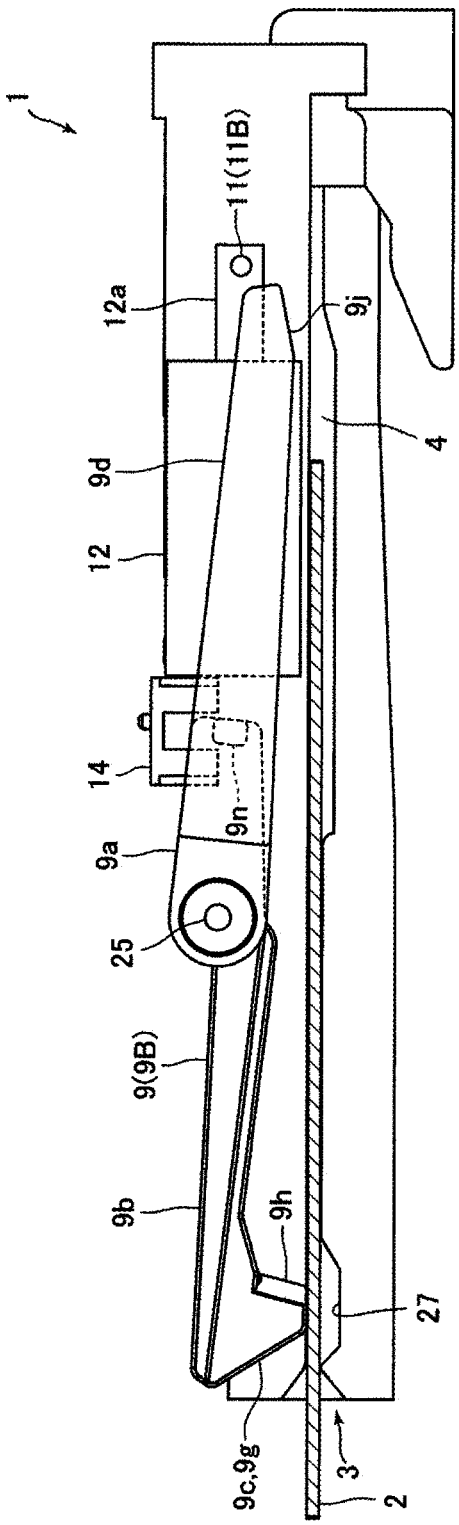
FIG. 3A is an explanatory side view showing a state that a card is being inserted into the card reader in FIG. 1.
Figure 3B:
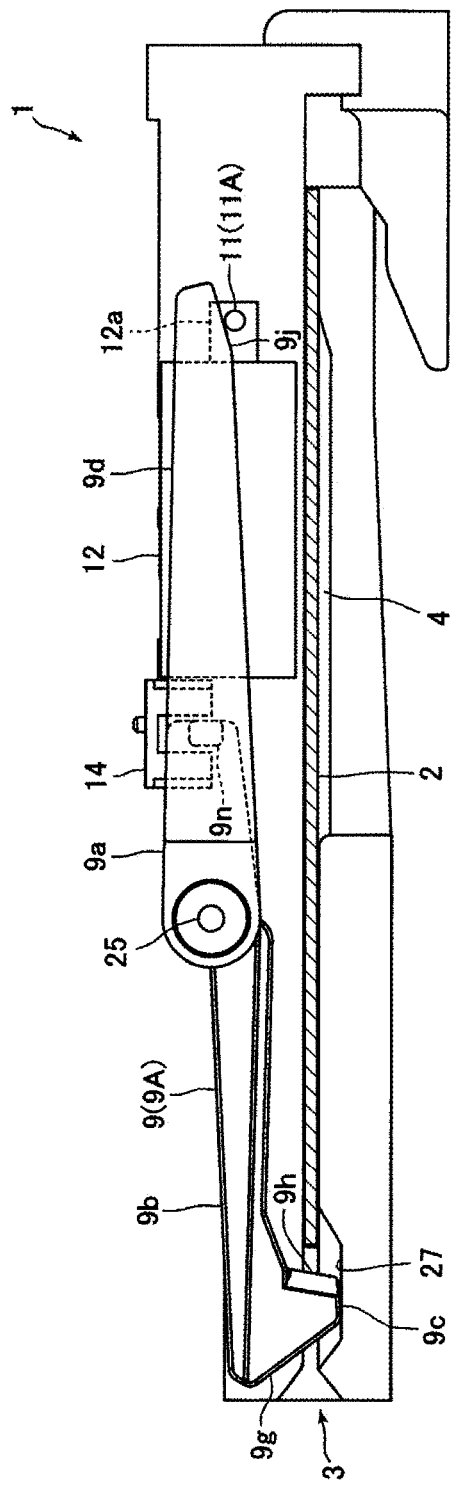
FIG. 3B is an explanatory side view showing a state that insertion of the card into the card reader in FIG. 1 has been completed.
Figure 4A:
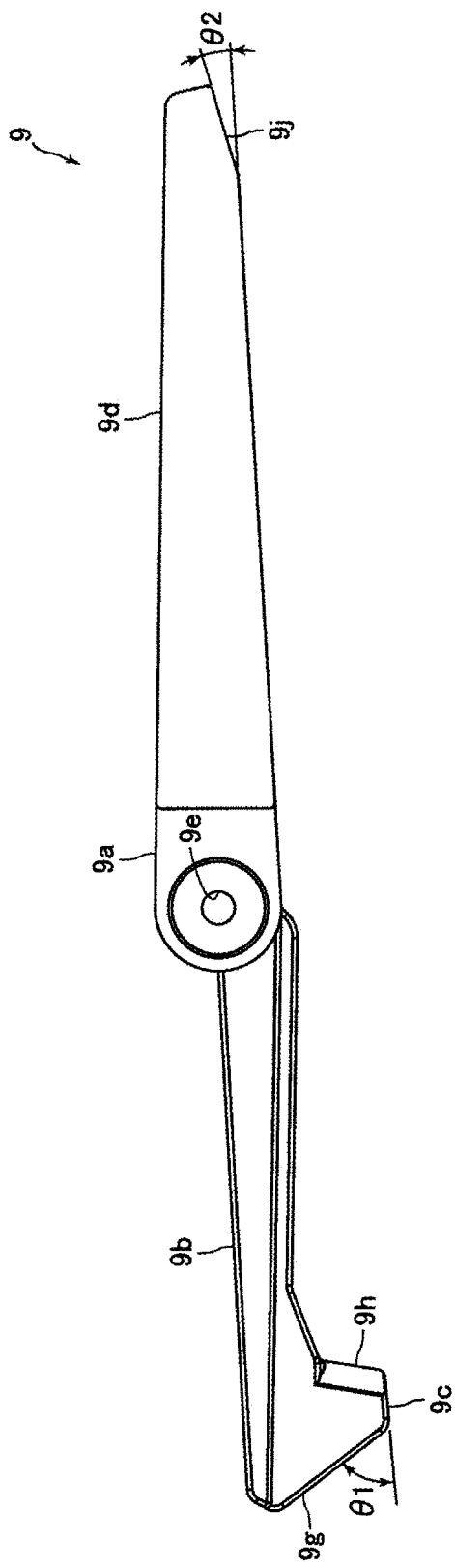
FIG. 4A is a side view showing a lever member in FIG. 1.
Figure 4B:
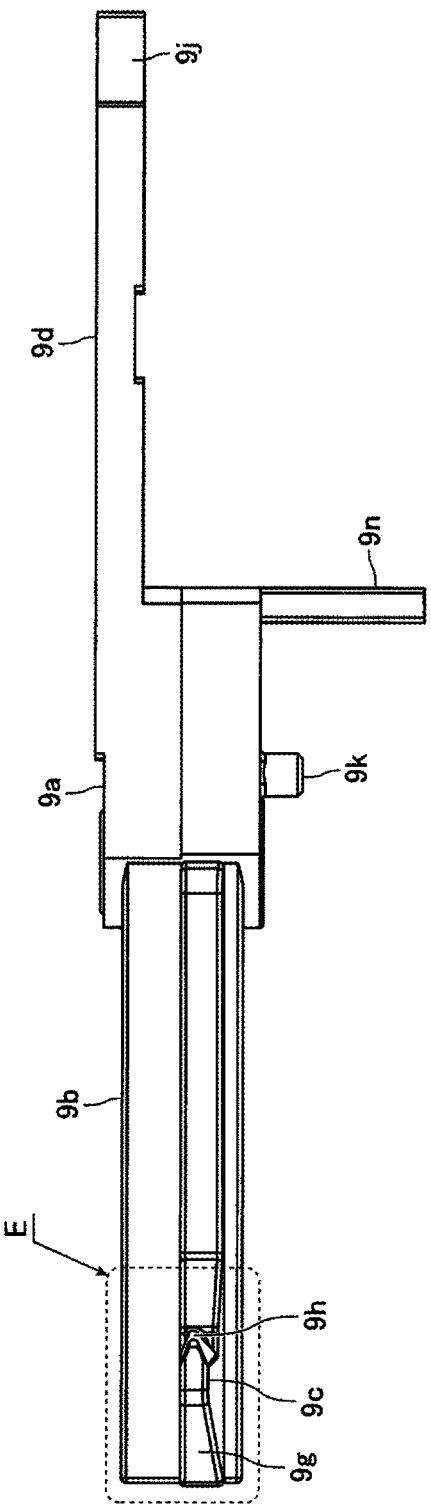
FIG. 4B is a bottom view showing a lever member in FIG. 1.
Figure 5:
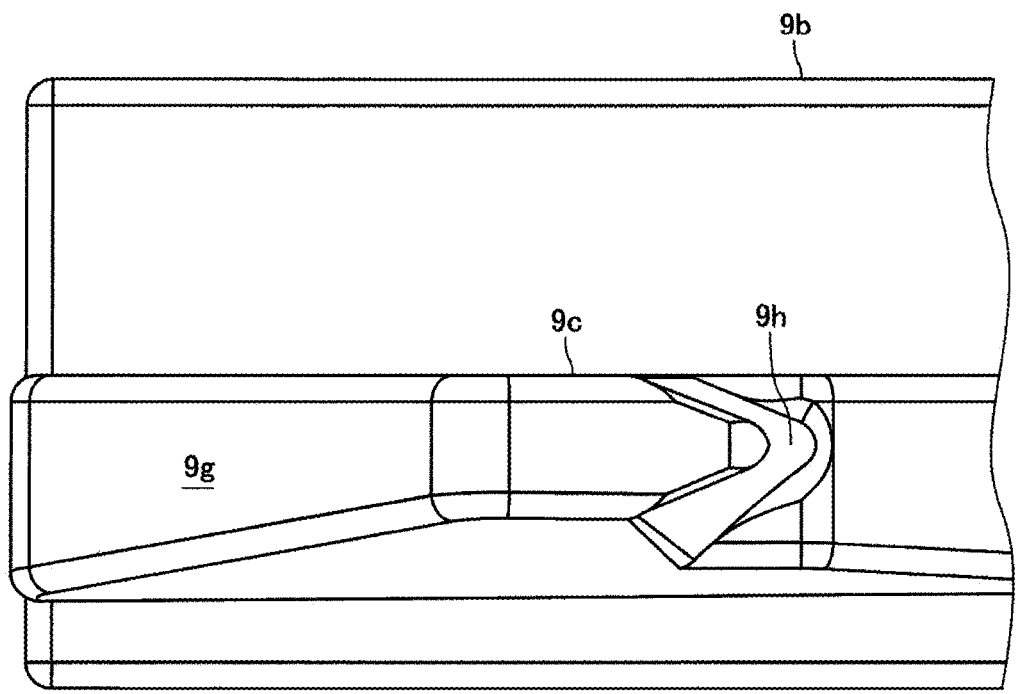
FIG. 5 is an enlarged view showing the "E"-part in FIG. 4B.

FIG. 3A is an explanatory side view showing a state that a card 2 is being inserted into the card reader 1 shown in FIG. 1, and FIG. 3B is an explanatory side view showing a state that insertion of the card 2 into the card reader 1 shown in FIG. 1 has been completed. FIG. 4A is a side view showing the lever member 9 in FIG. 1, and FIG. 4B is a bottom view showing the lever member 9 in FIG. 1. FIG. 5 is an enlarged view showing the "E"-part in FIG. 4B.

As described above, the lever member 9 functions to prevent pulling-out of a card 2 having been inserted into the card reader 1. Specifically, the lever member 9 functions to prevent pulling-out of a card 2 when the IC contact springs are contacted with external connection terminals of the card 2 and communication of data is performed between the card 2 and the card reader 1. Further, the lever member 9 is formed in a bar shape which is thin and long as a whole and is disposed on a right end side of the card reader 1 so that a longitudinal direction of the lever member 9 is substantially coincided with the front and rear direction.

The lever member 9 is provided with a turning center part 9a which is a turning center of the lever member 9, an extended part 9b which is extended from the turning center part 9a toward a front side, a card abutting member 9c which is protruded to a lower side from a front end of the extended part 9b, and an extended part 9d which is extended from the turning center part 9a toward a rear side. In the lever member 9, the turning center part 9a, the extended part 9b and the extended part 9d are integrally formed of resin as a main body member.

On the other hand, the card abutting member 9c of the lever member 9 is formed of metal. The metal which structures the card abutting member 9c may be, for example, an alloy such as stainless steel, iron-based alloy, and aluminum-based alloy. The card abutting member 9c is fixed to a lower side of a tip end on a front side of the extended part 9b which is a part of the main body member by utilizing various methods such as fitting, adhesion, screwing, and integral molding.

The turning center part 9a is disposed on an upper side with respect to the card moving passage 4. A fixed shaft 25 which turnably supports the lever member 9 is passed through the turning center part 9a. The turning center part 9a is formed with a shaft hole 9e through which the fixed shaft 25 is passed (see FIG. 4A). The fixed shaft 25 is fixed to the frame of the card reader 1. An axial direction of the fixed shaft is coincided with the right and left direction. The lever member 9 is capable of turning with the right and left direction as an axial direction of turning and with the fixed shaft 25 as a turning center.

A lower end of the card abutting member 9c is formed to be a flat face. As shown in FIG. 3A, when a card 2 is being inserted into the card reader 1, an upper face of the card 2 is abutted with a lower end of the card abutting member 9c which is formed to be a flat face. In this state, the lower end of the card abutting member 9c is set to be substantially parallel to the upper face of the card 2. A front end 9g of the card abutting member 9c is formed to be an inclined face in a flat face shape which is inclined to a lower side toward a rear side. Therefore, in the following descriptions, the front end 9g is referred to as an "inclined face 9g". When viewed in the right and left direction, an inclination angle θ1 (see FIG. 4A) of the inclined face 9g with respect to the lower end of the card abutting member 9c is 37°.

A width in the right and left direction of a rear end part of the card abutting member 9c becomes narrower as going toward a rear side. When viewed in the upper and lower direction, both side faces in the right and left direction of the rear end part of the card abutting member 9c are inclined with respect to the front and rear direction so as to approach each other as going toward the rear side (see FIG. 5). A rear end 9h of the card abutting member 9c is formed in a protruding curved face shape. Specifically, the rear end 9h of the card abutting member 9c is formed in a protruding curved face shape in which both side faces in the right and left direction of the rear end part of the card abutting member 9c are smoothly connected with each other. Further, the both side faces in the right and left direction of the rear end part of the card abutting member 9c are inclined so that a width in the right and left direction of the rear end part of the card abutting member 9c becomes narrower as going toward a lower side. The rear end 9h of the card abutting member 9c is inclined to an upper side as going toward a rear side.

The extended part 9d is disposed on an upper side with respect to the card moving passage 4. A lower face of a rear end part of the extended part 9d is formed with an abutting face 9j in a flat face shape with which a restriction pin 11 is capable of abutting. The abutting face 9j is formed to be an inclined face which is inclined to an upper side as going toward a rear side. When viewed in the right and left direction, an inclination angle θ2 of the abutting face 9j with respect to the lower end of the card abutting member 9c is 17° (see FIG. 4A).

The fixed shaft 25 is passed through the torsion coil spring 10. The torsion coil spring 10 is disposed on a left side with respect to the turning center part 9a. One end of the torsion coil spring 10 is engaged with a spring engaging part 26 formed in the frame of the card reader 1, and the other end of the torsion coil spring 10 is engaged with an engaging projection 9k formed in the lever member 9. The torsion coil spring urges the lever member 9 in a counterclockwise direction.

In a state that a card 2 is not inserted, as shown in FIG. 2, a lower end of the card abutting member 9c is contacted with a bottom face of a recessed part 27, which is formed on a lower face of a right front end part of the card moving passage 4, by an urging force of the torsion coil spring 10. When the lower end of the card abutting member 9c is contacted with the bottom face of the recessed part 27, the lever member 9 is located at the closing position 9A. When the lever member 9 is located at the closing position 9A, the card abutting member 9c closes a part of the card moving passage 4. Specifically, when the lever member 9 is located at the closing position 9A, the card abutting member 9c closes a part on a right front end side of the card moving passage 4.

In a state that the lever member 9 is located at the closing position 9A, a rear end of a card 2 inserted into the card reader 1 is capable of contacting with the inclined face 9g of the card abutting member 9c. When a card 2 is inserted in a state that the lever member 9 is located at the closing position 9A, a rear end (tip end) of the card 2 is contacted with the inclined face 9g of the lever member 9 which closes a part of the right front end side of the card moving passage 4. When the card 2 including a rear end contacted with the inclined face 9g is further inserted to the rear side, the inclined face 9g is moved along the rear end of the card 2. When the inclined face 9g is moved along the rear end of the card 2, as shown in FIG. 3A, the lever member 9 is turned in a clockwise direction against an urging force of the torsion coil spring 10 and a part of the right front end side of the card moving passage 4 is opened. A position of the lever member 9 in a state that a part of the right front end side of the card moving passage 4 is opened is the open position 9B.

After that, the card 2 is further inserted to the rear side and, when a front end of the card 2 is passed through a lower side of the card abutting member 9c, as shown in FIG. 3B, the lever member 9 is turned in a counterclockwise direction by an urging force of the torsion coil spring 10 until the lower end of the card abutting member 9c is contacted with the recessed part 27 (in other words, turned to the closing position 9A) and the part of the right front end side of the card moving passage 4 is closed. in this state, a front end of the card 2 having been inserted into the card reader 1 is capable of contacting with the rear end 9h of the card abutting member 9c. In other words, when the lever member 9 is located at the closing position 9A, a front end of a card 2 having been inserted into the card reader 1 is capable of contacting with the rear end 9h of the card abutting member 9c.

In a state that the lever member 9 is located at the closing position 9A, when a card 2 having been inserted into the card reader 1 is going to be pulled toward a front side, a front end of the card 2 is contacted with the rear end 9h of the card abutting member 9c of the lever member 9. When the card 2A including a front end contacted with the rear end 9h of the card abutting member 9c is further pulled to the front side, the rear end 9h of the card abutting member 9c is moved along the front end of the card 2. When the rear end 9h of the card abutting member 9c is moved along the front end of the card 2, the lever member 9 is turned in a clockwise direction against an urging force of the torsion coil spring 10 to open a part of the right front end side of the card moving passage 4.

The lever member 9 is formed with a light shading part 9n for detecting presence or absence of a card 2. The light shading part 9n is protruded from a rear side with respect to the turning center part 9a toward a left side. The light shading part 9n blocks a light from the light emitting element of the sensor 14 toward its light receiving element when the lever member 9 is located at the closing position 9A (see FIG. 2 and FIG. 3B). On the other hand, when the lever member 9 is located at the open position 9B, the light receiving element of the sensor 14 receives a light from its light emitting element (see FIG. 3A). When the light receiving element of the sensor 14 receives a light from the light emitting element to turn the sensor 14 to an "OFF" state, it is detected that a card 2 exists on the front end side of the card reader 1. In this embodiment, it is also detected that a card 2 is inserted into the card reader 1 by the sensor 14 and the light shading part 9n.

(Structure of Restriction Pin and Surrounding Portion)

The restriction pin 11 is formed in a long and thin columnar shape. The restriction pin 11 is fixed to a tip end side of a plunger 12a of a solenoid 12 so that an axial direction of the restriction pin 11 and the right and left direction are coincided with each other. Both end parts in the right and left direction of the restriction pin 11 are protruded from the plunger 12a to outer sides in the right and left direction. The restriction pin 11 is disposed at substantially the same height as the fixed shaft 25. The solenoid 12 is disposed so that the plunger 12a is protruded toward a rear side. The plunger 12a is disposed on a left side with respect to a rear end part of the extended part 9d. The plunger 12a is passed through a compression coil spring for returning (not shown) and is urged to a rear side by the compression coil spring.

As shown in FIG. 2 and FIG. 3A, in a state that the solenoid 12 is not driven (an electric current is not supplied to the solenoid 12) and the plunger 12a is protruded to a rear side by an urging force of the compression coil spring, the restriction pin 11 is disposed on a rear side with respect to the abutting face 9j. A position of the restriction pin 11 in this state is the turnable position 11B where the lever member 9 is turnable. On the other hand, as shown in FIG. 3B, in a state that the solenoid 12 is driven (an electric current is supplied to the solenoid 12) and the plunger 12a is pulled to a front side, a right side portion of the restriction pin 11 is located at a position capable of abutting with the abutting face 9j. The position of the restriction pin 11 in this state is the turning restriction position 11A where turning of the lever member 9 is restricted.

A portion of the restriction pin 11 which is protruded from the plunger 12a to the right side is passed through a guide groove formed in a support member 31. A portion of the restriction pin 11 which is protruded from the plunger 12a to the left side is passed through a guide groove formed in a support member 32. The restriction pin 11 is guided in the front and rear direction by the guide groove formed in the support member 31 and the guide groove formed in the support member 32.

(Schematic Operation of Card Reader)

In a state that a card 2 is not inserted into the card reader 1, as shown in FIG. 2, the lever member 9 is located at the closing position 9A by an urging force of the torsion coil spring 10. In this state, the plunger 12a is protruded to a rear side and the lever member 9 is set to be capable of turning. Further, in this state, the IC contact block 6 is urged to a front side by an urging force of the tension coil spring 21, and the IC contact springs are located on an upper side with respect to the card moving passage 4. Further, in this state, the sensor 14 is in an "ON" state and the sensor 15 is in an "OFF" state.

When a card 2 is inserted and a rear end of the card 2 is abutted with the inclined face 9g, the lever member 9 is turned in a clockwise direction by the inserted card 2 against an urging force of the torsion coil spring 10 and a part on the right front end side of the card moving passage 4 is opened (see FIG. 3A). When the lever member 9 is turned in the clockwise direction, the light shading part 9n is separated from a position between the light emitting element and the light receiving element of the sensor 14 and a light from the light emitting element of the sensor 14 is received by the light receiving element and thus, the sensor 14 is turned to an "OFF" state and it is detected that the card 2 is inserted.

After that, the card 2 is further inserted to a rear side and, when a front end of the card 2 passes through a lower side of the card abutting member 9c, as shown in FIG. 3B, the lever member 9 is turned in a counterclockwise direction by an urging force of the torsion coil spring 10 and a part on the right front end side of the card moving passage 4 is closed. When the lever member 9 is turned in a counterclockwise direction, a light from the light emitting element of the sensor 14 toward its light receiving element is blocked by the light shading part 9n and the sensor 14 is turned to an "ON" state again.

Further, when the card 2 is inserted to a rear side, the IC contact block 6 is moved downward while sliding to a rear side by the inserted card 2 and the IC contact springs are contacted with an IC chip of the card 2. In this state, communication of data is performed between the card 2 and the card reader 1. Further, when the IC contact block 6 is slid to a rear side, a light from a light emitting element of the sensor 15 toward its light receiving element is blocked by the light shading part 6a and thus, the sensor 15 is turned to an "ON" state and it is detected that a card 2 exists on a rear end side of the card reader 1.

In this embodiment, when the sensor 14 having been turned to an "OFF" state is turned to an "ON" state again and, in addition, when the sensor 15 is turned to an "ON" state, the solenoid 12 is driven and the plunger 12a is pulled to a front side and, as shown in FIG. 3B, a state that the restriction pin 11 is capable of abutting with the abutting face 9*j* is obtained. In other words, in this state, turning of the lever member 9 is restricted. Therefore, even when a user is tried to pull the card 2 to a front side, a front end of the card 2 is contacted with the rear end 9*h* of the card abutting member 9*c* of the lever member 9 of which turning is restricted and thus, pulling-out of the card 2 is prevented.

When communication of data between the card 2 and the card reader 1 is finished, energization to the solenoid 12 is stopped and the plunger 12*a* is protruded to a rear side. In other words, the lever member 9 is set in a state that the lever member 9 is turnable. In this state, the card 2 is pulled out toward a front side. When the card 2 is started to be pulled out, a front end of the card 2 is abutted with the rear end 9*h* of the card abutting member 9*c* and thus, the lever member 9 is turned in a clockwise direction by the card 2 which is being pulled out against an urging force of the torsion coil spring 10, and a part on the right front end side of the card moving passage 4 is opened.

Principal Effects of First Embodiment

As described above, in the first embodiment, the turning center part 9*a*, the extended part 9*b* and the extended part 9*d* which are a main body member of the lever member 9 are formed of resin, and the card abutting member 9*c* of the lever member 9 which is to be abutted with a card 2 is formed of metal. Therefore, in the first embodiment, strength of the card abutting member 9*c* is increased and thus, even when a metal card 2 is inserted into and pulled out from the card reader 1, damage (abrasion and dent) of the card abutting member 9*c* of the lever member 9, specifically, the inclined face 9*g* and the rear end 9*h* can be restrained. Accordingly, functional disorder of the card reader 1 can be restrained. For example, a situation that insertion and pulling-out of a card (card 2 or other cards) to and from the card reader 1 becomes difficult is restrained, and a situation that a card insertion and pulling-out detection function and a latch function provided in the card reader 1 do not operate normally is restrained.

Further, in the first embodiment, the turning center part 9*a*, the extended part 9*b* and the extended part 9*d* which are the main body member of the lever member 9 are formed of resin. Therefore, in comparison with a case that the entire lever member 9 is formed of metal, an increase of weight of the lever member 9 can be restrained. Accordingly, for example, in a state that the lever member 9 is urged by the torsion coil spring 10, a situation that control of turning of the lever member 9 becomes difficult can be prevented.

Second Embodiment

Structures of a second embodiment of the present invention which are different from the first embodiment will be described below. A card reader 1 in the second embodiment includes, instead of the lever member 9 in the first embodiment, a lever member 19 as a pulling-out prevention member for preventing pulling-out of a card 2 having been inserted into the card reader 1.

Figure 6:
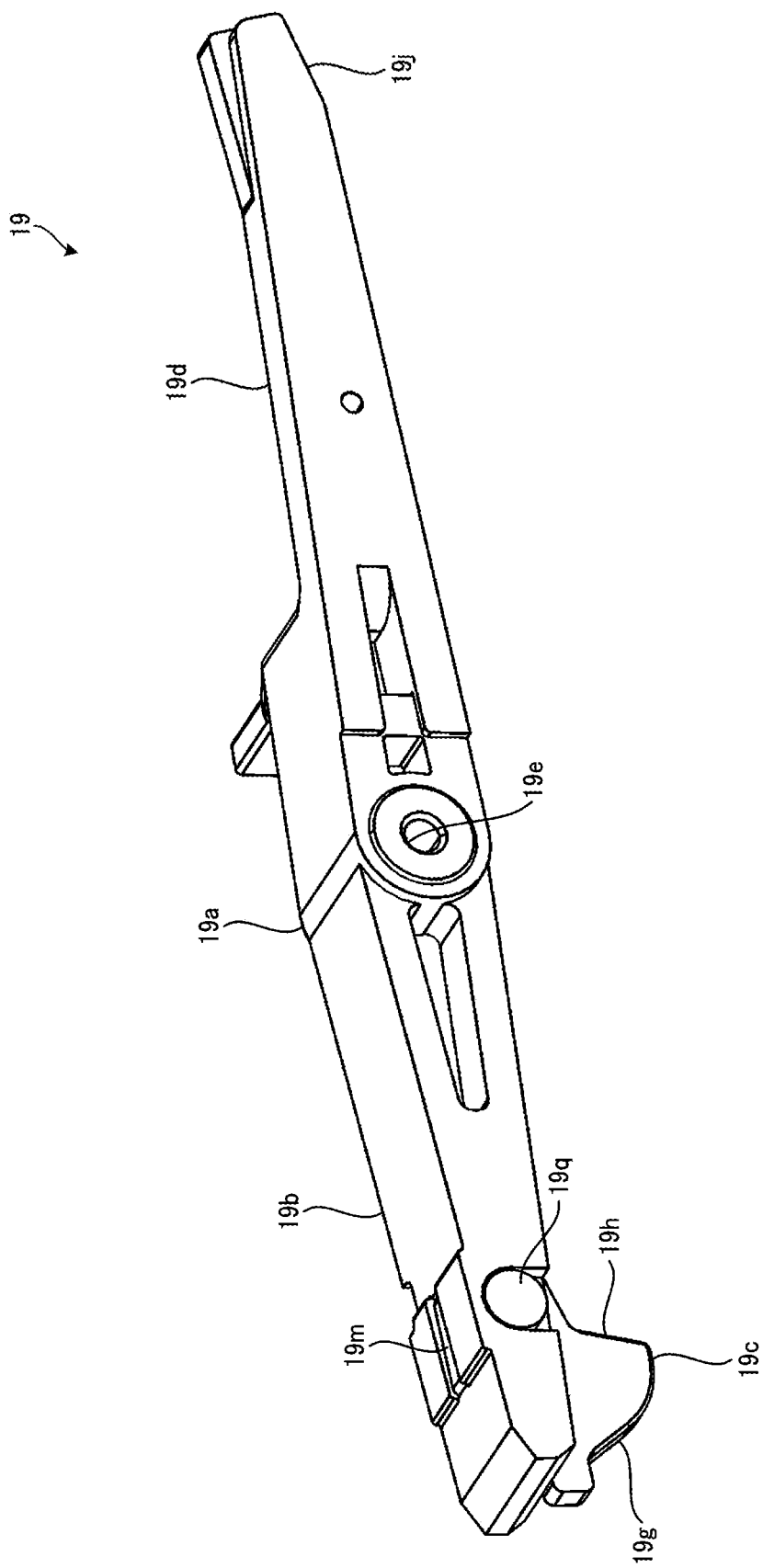
FIG. 6 is a perspective view showing a lever member in accordance with a second embodiment of the present invention.
Figure 7:
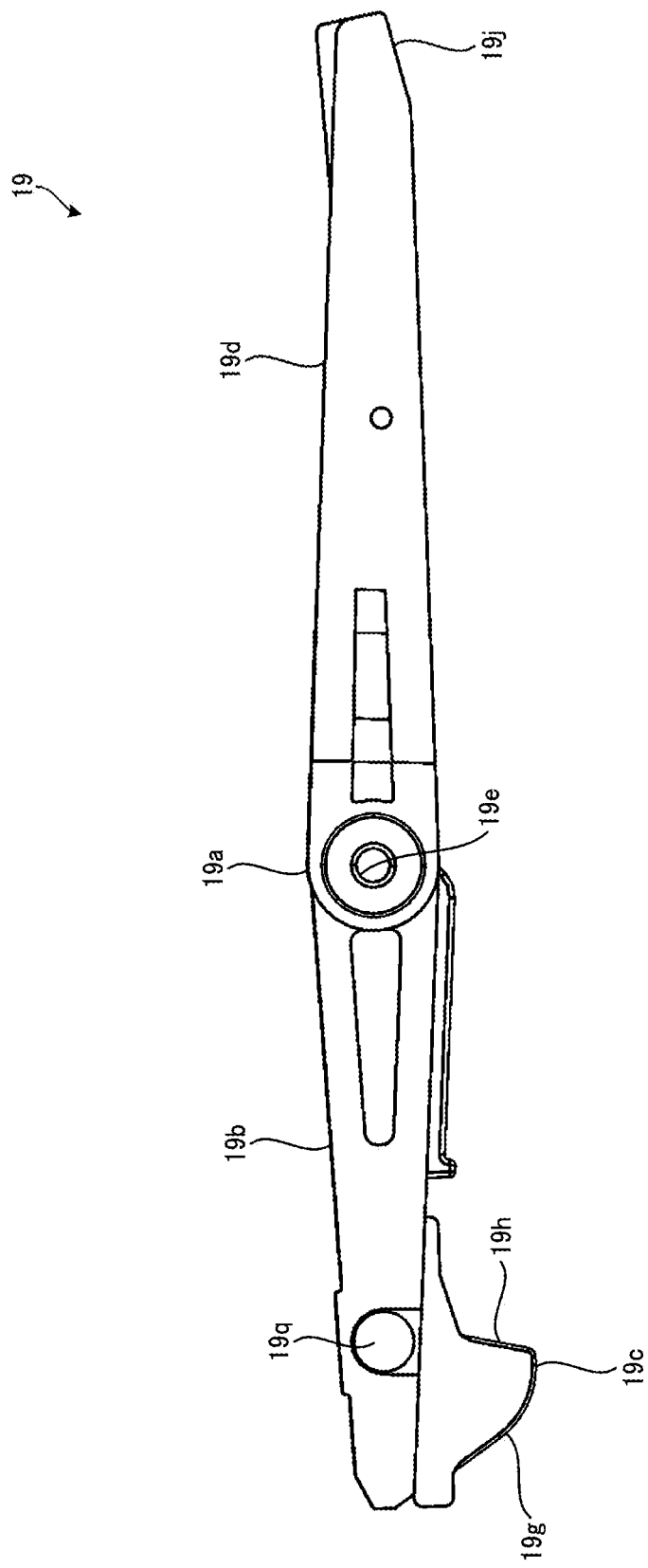
FIG. 7 is a side view showing the lever member in FIG. 6.
Figure 8:
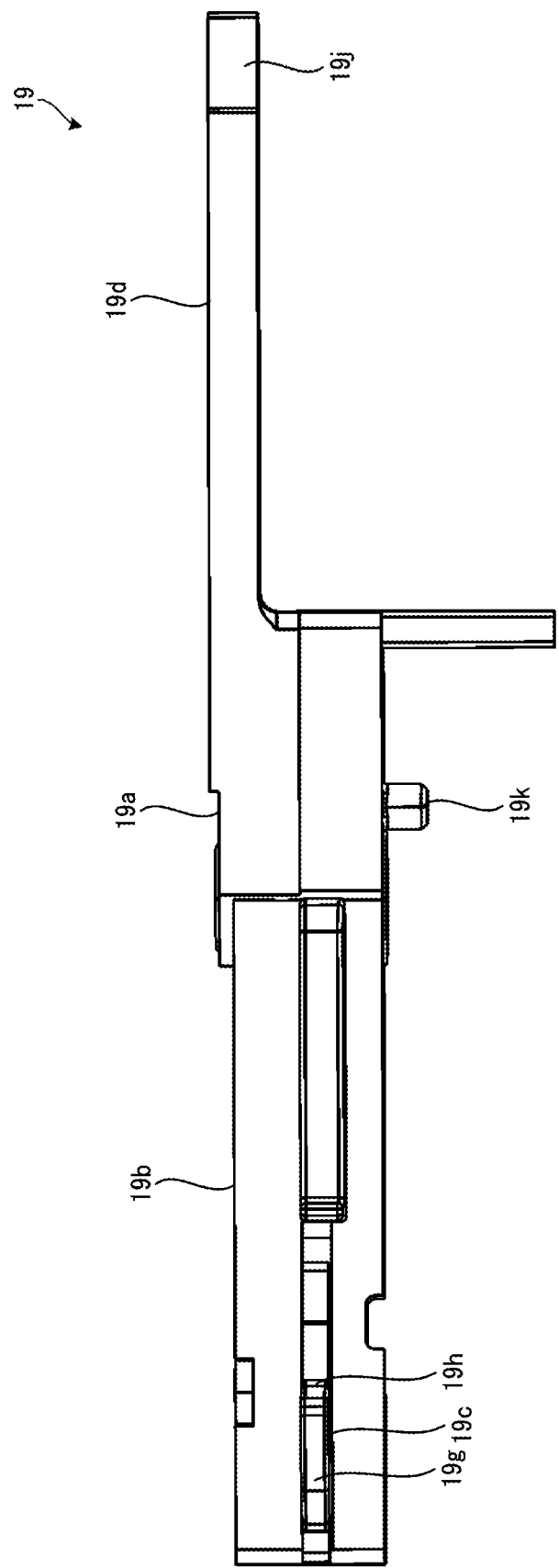
FIG. 8 is a bottom view showing the lever member in FIG. 6.
Figure 9:
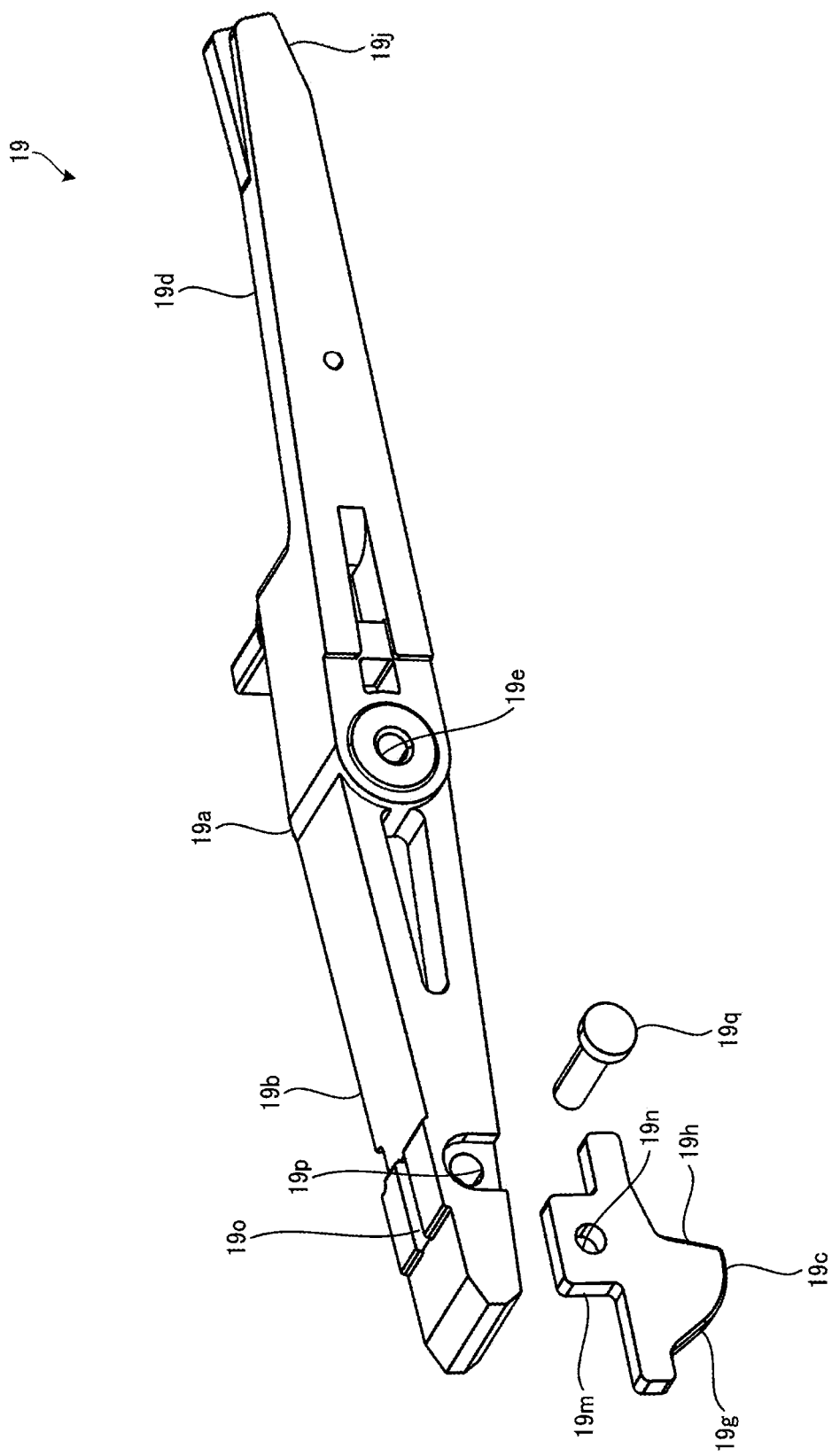
FIG. 9 is an exploded perspective view showing the lever member in FIG. 6.
Figure 10:
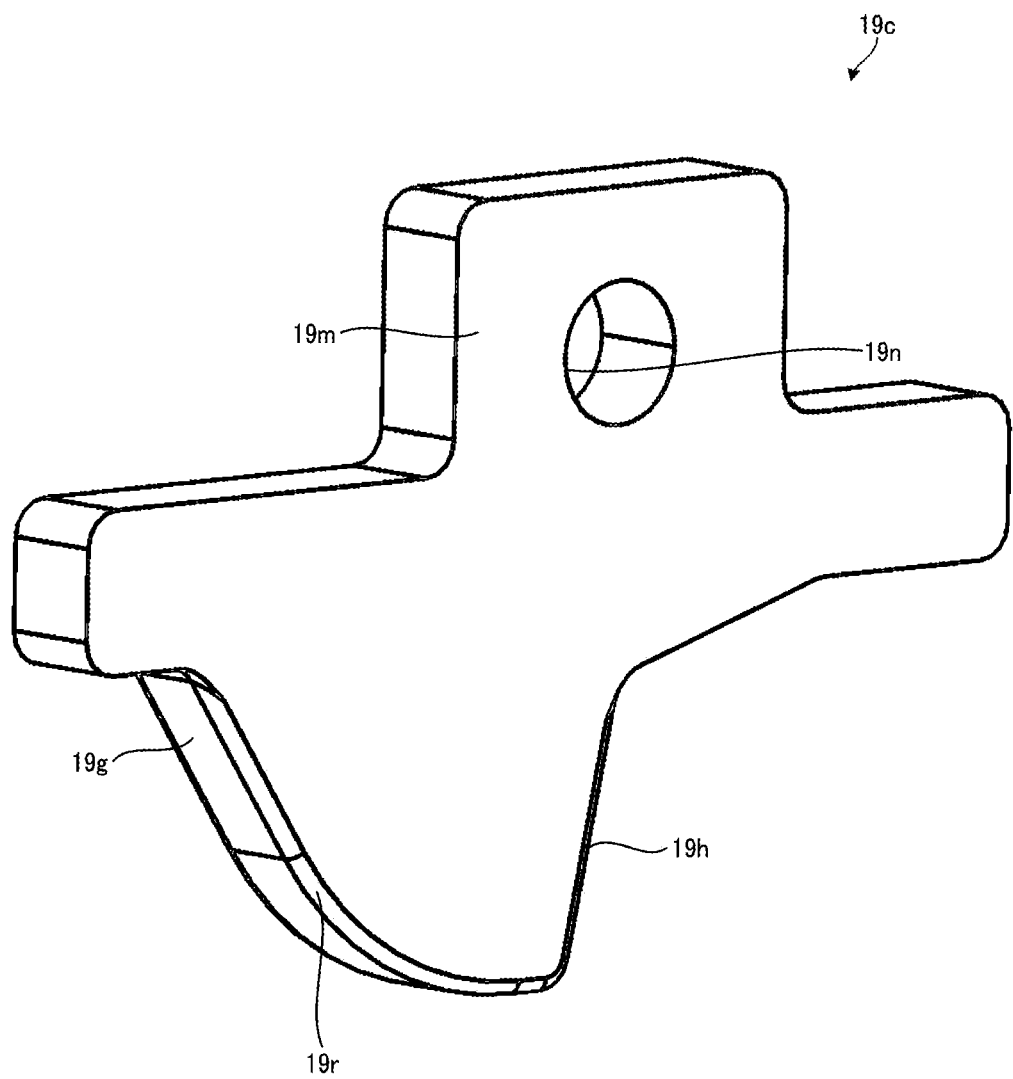
FIG. 10 is an enlarged perspective view showing a card abutting member of the lever member shown in FIG. 6.

FIG. 6 is a perspective view showing a lever member 19 in accordance with a second embodiment of the present invention. FIG. 7 is a side view showing the lever member 19 in FIG. 6. FIG. 8 is a bottom view showing the lever member 19 in FIG. 6. FIG. 9 is an exploded perspective view showing the lever member 19 in FIG. 6. FIG. is an enlarged perspective view showing a card abutting member of the lever member 19 shown in FIG. 6.

The lever member 19 is provided with a turning center part 19*a*, an extended part 19*b* and an extended part 19*d* as a main body member. The turning center part 19*a*, the extended part 19*b* and the extended part 19*d* are structures which are respectively similar to the turning center part 9*a*, the extended part 9*b* and the extended part 9*d* in the first embodiment. However, a size and a shape of each of the turning center part 19*a*, the extended part 19*b* and the extended part 19*d* are appropriately adjusted according to a weight and a shape of a card abutting member 19*c* described below.

A shaft hole 19*e* (see FIG. 6 and FIG. 7) which is formed in the turning center part 19*a* is structured similarly to the shaft hole 9*e* in the first embodiment. An abutting face 19*j* (see FIG. 6 through FIG. 9) which is formed on a lower face of a rear end part of the extended part 19*d* is structured similarly to the abutting face 9*j* in the first embodiment.

The extended part 19*b* is provided with a rectangular hole 19*o* to which a protruding part 19*m* of a card abutting member 19*c* described below is capable of being fitted and a screw hole 19*p* having a screw groove corresponding to a screw 19*q* described below (see FIG. 9). The rectangular hole 19*o* is a hole which penetrates through the extended part 19*b* in the upper and lower direction, and the screw hole 19*p* is a hole which penetrates through the extended part 19*b* in the right and left direction.

Further, the lever member 19 is provided with a card abutting member 19*c*. The card abutting member 19*c* is structured similarly to the card abutting member 9*c* in the first embodiment and is, for example. formed of an alloy such as stainless steel. In this embodiment, the card abutting member 19*c* is detachably provided to the extended part 19*b*. Further, the card abutting member 19*c* is a plate-shaped member of which a length (thickness) in the right and left direction is substantially constant.

Further, the card abutting member 19*c* is provided with a protruding part 19*m* which is capable of being fitted to the rectangular hole 19*o* of the lever member 19 in its upper part. The protruding part 19*m* is provided with a screw hole 19*n* which penetrates through the protruding part 19*m* in the right and left direction. The screw hole 19*n* is provided at a position overlapped with the screw hole 19*p* in the right and left direction when the protruding part 19*m* is fitted to the rectangular hole 19*o*.

Therefore, when the protruding part 19*m* of the card abutting member 19*c* is fitted to the rectangular hole 19*o* of the extended part 19*b* and the screw 19*q* is turned and inserted into the screw hole 19*p* and the screw hole 19*n*, the card abutting member 19*c* is screwed and fixed to the extended part 19*b*. In this case, positional displacement of the card abutting member 19*c* with respect to the extended part 19*b* in a direction perpendicular to the right and left direction is prevented by the screw 19*q* and turning of the card abutting member 19*c* with respect to the extended part 19*b* with the right and left direction as a turning axis is prevented by fitting of the protruding part 19*m* to the rectangular hole 19*o*.

An inclined face 19*g* (front end 19*g*) of the card abutting member 19*c* is structured similarly to the inclined face 9*g* (front end 9*g*) of the card abutting member 9*c* in the first embodiment. However, the inclined face 19*g* is formed in a protruding curved face shape. When viewed in the right and left direction (see, for example. FIG. 7), an abutting angle of the card abutting member 19*c* abutting with a card 2 which is inserted into a card reader 1 is changed depending on a turning angle of the lever member 19 due to insertion of the card 2 with the turning center part 19*a* as a center. Therefore, for example, the inclined face 19g is formed in a flat face shape, an abutting angle of the inclined face 19g abutting with a card 2 becomes larger according to insertion of the card 2 and thus, an end part of the card 2 may be caught on the inclined face 19g. When an end part of the card 2 is caught on the inclined face 19g, at least one of the inclined face 19g and the card 2 may occur a dent (notch).

On the other hand, when the inclined face 19g is formed in a protruding curved face shape, change of an abutting angle of the inclined face 19g abutting with a card 2 according to a turning angle of the lever member 19 is made smaller and thus, catching of an end part of the card 2 on the inclined face 19g can be restrained. Therefore, dents (notch) of the inclined face 19g and the card 2 can be restrained.

Further, corner parts 19r (end parts in the right and left direction of the inclined face 19g) of a portion where the inclined face 19g is formed in the card abutting member 19c is performed with chamfering. As a result, catching of an end part of a card 2 on the inclined face 19g can be further restrained. Therefore, a dent (notch) and the like of the inclined face 19g and/or the card 2 can be restrained. Chamfering can be performed by various processing methods such as barrel polishing.

A rear end 19h of the card abutting member 19c is structured similarly to the rear end 9h of the card abutting member 9c in the first embodiment. In this case, the rear end 19h may be also formed in a protruding curved face shape similarly to the inclined face 19g. According to this structure, catching of an end part of a card 2 on the rear end 19h can be restrained. Therefore, a dent (notch) and the like of the inclined face 19g and/or a card 2 can be restrained.

Further, corner parts of a portion where the rear end 19h is formed in the card abutting member 19c is performed with chamfering similarly to the corner parts 19r. As a result, catching of an end part of a card 2 on the rear end 19h can be restrained. Therefore, a dent (notch) and the like of the inclined face 19g and/or a card 2 can be restrained.

Principal Effects of Second Embodiment

As described above, in the second embodiment, the turning center part 19a, the extended part 19b and the extended part 19d which are a main body member of the lever member 19 are formed of resin, and the card abutting member 19c of the lever member 19 which is to be abutted with a card 2 is formed of metal. Therefore, in the second embodiment, strength of the card abutting member 19c is increased and thus, even when a metal card 2 is inserted into and pulled out from the card reader 1, damage (abrasion and/or dent) of the card abutting member 19c of the lever member 19 can be restrained. Accordingly, functional disorder of the card reader 1 can be restrained. For example, a situation that insertion and pulling-out of a card (card 2 or other cards) to and from the card reader 1 becomes difficult can be restrained, and a situation that a card insertion and pulling-out detection function and a latch function provided in the card reader 1 do not operate normally can be restrained.

Further, in the second embodiment, the turning center part 19a, the extended part 19b and the extended part 19d which are a main body member of the lever member 19 are formed of resin. Therefore, in comparison with a case that the entire lever member 19 is formed of metal, an increase of weight of the lever member 19 can be restrained. Accordingly, for example, in a state that the lever member 19 is urged by the torsion coil spring 10, a situation that control of turning of the lever member 19 becomes difficult can be prevented.

Further, in comparison with a case that the entire lever member 19 is formed of metal, a manufacturing cost of the lever member 19 can be restrained.

Further, in the second embodiment, the card abutting member 19c is capable of being attached to and detached from the extended part 19b by using the screw 19q. Therefore, even when the card abutting member 19c of the lever member 19 is damaged, only the card abutting member 19c of the lever member 19 is easily replaced. Accordingly, when the card abutting member 19c is damaged, replacement of the card abutting member 19c can be performed at a low cost.

Further, in the second embodiment, the inclined face 19g (front end 19g) of the card abutting member 19c is formed in a protruding curved face shape. Therefore, change of an abutting angle of the inclined face 19g of the card abutting member 19c with a card 2 according to a turning angle of the lever member 19 is reduced and catching of an end part of the card 2 on the inclined face 19g of the card abutting member can be restrained. Therefore, a dent (notch) and the like of the inclined face 19g of the card abutting member 19c and/or the card 2 can be restrained.

Further, material having high strength such as metal is used as the card abutting member 19c and thus, a dent (notch) may easily occur in a non-metal card having low strength. However, the inclined face 19g is formed in a protruding curved face shape and thus, catching of an end part of a card on the inclined face 19g can be restrained and a dent (notch) of a card having low strength can be restrained.

Further, in the second embodiment, the corner parts 19r of the inclined face 19g of the card abutting member 19c are performed with chamfering and thus, catching of an end part of a card 2 on the inclined face 19g of the card abutting member 19c can be further restrained. Therefore, a dent (notch) and the like of the inclined face 19g of the card abutting member 19c and/or a card 2 can be restrained.

Further, material having high strength such as metal is used in the card abutting member 19c and thus, a dent (notch) may easily occur in a non-metal card having low strength. However, the corner parts 19r of the inclined face 19g of the card abutting member 19c is performed with chamfering and thus, catching of an end part of a card on the inclined face 19g can be restrained and a dent (notch) of a card having low strength can be restrained.

Other Embodiments

Although the present invention has been shown and described with reference to a specific embodiment, various changes and modifications will be apparent to those skilled in the art from the teachings herein.

For example, in the embodiments described above, the card abutting member 9c (card abutting member 19c) of the lever member 9 (lever member 19) are formed of metal. However, the card abutting member 9c (card abutting member 19c) may be formed of material having a strength higher than a strength of resin which structures a main body part of the lever member 9 (lever member 19) and, for example, ceramic may be used.

Further, in the embodiments described above, the lever member 9 (lever member 19) may be urged toward the closing position 9A by a spring member other than the torsion coil spring 10, for example, by a compression coil spring, a tension coil spring or a plate spring. Further, in the embodiments described above, the card reader 1 may include no magnetic head 7.

Structure (1)

A card reader which is structured to perform at least one of reading of data recorded in a card and recording of data to the card includes a card moving passage where the card is moved, a pulling-out prevention member which is structured so as to be turnable between a closing position where the card moving passage is closed and an open position where the card moving passage is opened and which prevents pulling-out of the card having been inserted into the card reader at the closing position, an urging member which urges the pulling-out prevention member toward the closing position, a turning restriction member which is abutted with the pulling-out prevention member located at the closing position to restrict turning of the pulling-out prevention member, and a moving mechanism which moves the turning restriction member between a turning restriction position where turning of the pulling-out prevention member is restricted and a turnable position where turning of the pulling-out prevention member is permitted. In a case that a direction perpendicular to a moving direction of the card which is moved along the card moving passage and a thickness direction of the card moved along the card moving passage is referred to as a width direction of the card and, in the moving direction of the card, an inserting direction side of the card into the card reader is referred to as a rear side, and an opposite side to the rear side which is a pulling-out direction side of the card from the card reader is referred to as a front side. The pulling-out prevention member includes a main body member, and a card abutting member which closes a part of the card moving passage when the pulling-out prevention member is located at the closing position, the pulling-out prevention member is capable of turning with the width direction of the card as an axial direction of turning, a rear end of the card abutting member is capable of contacting with a front end of the card having been inserted into the card reader when the pulling-out prevention member is located at the closing position, the main body member is formed of resin, and the card abutting member is formed of material having a strength higher than a strength of the resin.

According to the above-mentioned structure (1), the card abutting member is formed of material having a strength higher than a strength of the resin of the main body member and thus, the strength of the card abutting member is increased. Therefore, even when a metal card is inserted into and pulled out from the card reader, damage (abrasion and dent) of the card abutting member of the pulling-out prevention member can be restrained. Accordingly, functional disorder of the card reader can be restrained.

Further, the main body member of the pulling-out prevention member is formed of resin and thus, increase of weight of the pulling-out prevention member can be restrained. Therefore, turning control of the pulling-out prevention member can be easily performed. Further, increase of a manufacturing cost of the pulling-out prevention member can be restrained.

Structure (2)

In the card reader described in the above-mentioned structure (1), the card abutting member is capable of being attached to and detached from the main body member.

According to the above-mentioned structure (2), even when the card abutting member of the pulling-out prevention member is damaged, only the card abutting member of the pulling-out prevention member is required to be replaced. Therefore, in a case that the card abutting member is damaged, replacement can be performed at a low cost.

Structure (3)

In the card reader described in the above-mentioned structure (2), the card abutting member can be attached to and detached from the main body member by using a screw.

According to the above-mentioned structure (3), only the card abutting member of the pulling-out prevention member can be replaced easily.

Structure (4)

In the card reader described in one of the above-mentioned structures (1) through (3), a front end of the card abutting member is formed in a protruding curved face shape.

According to the above-mentioned structure (4), change of an abutting angle of the front end of the card abutting member abutting with a card according to a turning angle of the pulling-out prevention member is reduced and catching of an end part of the card on the front end of the card abutting member can be restrained. Therefore, a dent (notch) and the like of the front end of the card abutting member and/or the card can be restrained.

Structure (5)

In the card reader described in one of the above-mentioned structures (1) through (4), a corner part of a front end of the card abutting member is chamfered.

According to the above-mentioned structure (5), catching of an end part of a card on the front end of the card abutting member can be restrained. Therefore, a dent (notch) and the like of the front end of the card abutting member and/or the card can be restrained.

Structure (6)

In the card reader described in one of the above-mentioned structures (1) through (5), the card abutting member is formed of metal or ceramic.

According to the above-mentioned structure (6), strength of the card abutting member can be set higher than strength of the main body member.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader which is structured to perform at least one of reading of data recorded in a card and recording of data to the card, the card reader comprising:
   a card moving passage where the card is moved;
   a pulling-out prevention member which is turnable between a closing position where the card moving passage is closed and an open position where the card moving passage is opened and which prevents pulling-out of the card having been inserted into the card reader at the closing position, the pulling-out prevention member comprising:
      a main body member; and
      a card abutting member which closes a part of the card moving passage when the pulling-out prevention member is located at the closing position;
   an urging member which urges the pulling-out prevention member toward the closing position;

a turning restriction member which is abutted with the pulling-out prevention member located at the closing position to restrict turning of the pulling-out prevention member; and a moving mechanism which moves the turning restriction member between a turning restriction position where turning of the pulling-out prevention member is restricted and a turnable position where turning of the pulling-out prevention member is permitted;

wherein in a case that a direction perpendicular to a moving direction of the card which is moved along the card moving passage and a thickness direction of the card moved along the card moving passage is referred to as a width direction of the card and, in the moving direction of the card, in a case that an inserting direction side of the card into the card reader is referred to as a rear side, and an opposite side to the rear side which is a pulling-out direction side of the card from the card reader is referred to as a front side, the pulling-out prevention member is turnable with the width direction of the card as an axial direction of turning;

a rear end of the card abutting member is contactable with a front end of the card having been inserted into the card reader when the pulling-out prevention member is located at the closing position;

the main body member is formed of resin; and the card abutting member is formed of material having a strength higher than a strength of the resin.

2. The card reader according to claim 1, wherein the card abutting member is attachable to and detachable from the main body member.

3. The card reader according to claim 2, wherein the card abutting member is attachable to and detachable from the main body member by using a screw.

4. The card reader according to claim 1, wherein a front end of the card abutting member is formed in a protruding curved face shape.

5. The card reader according to claim 1, wherein a corner part of a front end of the card abutting member is chamfered.

6. The card reader according to claim 1, wherein the card abutting member is formed of metal or ceramic.

* * * * *